(12) United States Patent
Ueki et al.

(10) Patent No.: US 6,198,259 B1
(45) Date of Patent: Mar. 6, 2001

(54) NON-INSULATING DC—DC CONVERTER

(75) Inventors: Kouichi Ueki, Saitama; Shigenori Kinoshita, Tokyo, both of (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/500,989

(22) Filed: Feb. 15, 2000

(30) Foreign Application Priority Data

Feb. 19, 1999 (JP) .................................................. 11-042328
Apr. 5, 1999 (JP) .................................................. 11-098245

(51) Int. Cl.$^7$ ...................................................... G05F 1/613
(52) U.S. Cl. ............................ 323/224; 323/225; 323/285
(58) Field of Search .................................... 323/222, 224, 323/225, 266, 275, 276, 282, 284, 285

(56) References Cited

U.S. PATENT DOCUMENTS 4,754,388 * 6/1988 Pospisil .............................. 363/266 X
5,850,137 * 12/1998 Takimoto et al. ................ 323/276 X

* cited by examiner

*Primary Examiner*—Jessica Han
(74) *Attorney, Agent, or Firm*—Kanesaka & Takeuchi

(57) ABSTRACT

A non-insulating DC—DC converter is formed of a first semiconductor switching element for reducing a DC voltage from a high-voltage battery, a control circuit connected to the first semiconductor switch element for controlling pulses relative to the first semiconductor switching element, a second semiconductor switching element provided on an output side of the first semiconductor element, a capacitor connected between the first and second semiconductor switching elements in parallel, and a first control circuit connected to one end of the capacitor and an output side of the second semiconductor switching element. The first control circuit detects a voltage at the one end of the capacitor and a voltage on the output side of the second semiconductor switching element, and turns off the second semiconductor switching element if an overvoltage occurs at the one end of the capacitor. The damage of the internal elements due to an overvoltage or a reverse current is prevented.

8 Claims, 7 Drawing Sheets

NON-INSULATING DC— DC CONVERTER

BACKGROUND OF THE INVENTION AND RELATED ART STATEMENT

The present invention relates to a non-insulating DC—DC converter for use in an electric vehicle, and more particularly, to a non-insulating DC—DC converter for use in charging a low-voltage battery with power from a high-voltage battery.

FIG. 7 shows an example of a conventional non-insulating DC—DC converter.

The non-insulating DC—DC converter shown in FIG. 7 comprises an input terminal 1b and an output terminal 7a. A check diode 12, a MOSFET 2, and a choke coil 4 are connected in series between the input terminal 1b and the output terminal 7a.

In addition, a diode 3 and a capacitor 5 are connected in parallel between the input terminal 1b and the output terminal 7a. The input terminal 1b has a battery terminal 1a for a high-voltage battery 1 connected thereto via an input cable 1c.

A control circuit 6 has a terminal connected to the high-voltage battery 1, a terminal connected to a gate of the MOSFET 2, and a terminal connected to one end of the capacitor 5. The output terminal 7a is connected to a low-voltage battery 7.

In such a configuration, the control circuit 6 applies a pulse voltage to the gate of the MOSFET 2 to control on/off operation of the MOSFET 2 in such a manner that a power from the high-voltage battery 1 is charged into the low-voltage battery 7.

In addition, if the control circuit 6 fails and provides an overvoltage to one end of the capacitor 5, the MOSFET 2 is turned off to prevent an output of the overvoltage. Furthermore, the inflow of an overcurrent is hindered by the check diode 12.

In the above conventional non-insulating DC—DC converter, however, if the MOSFET 2 is damaged due to an overvoltage or another reason, an overcurrent from the high-voltage battery 1 flows into the inside of the non-insulating DC—DC converter via an input cable 1c. When this occurs, the input cable 1c may be damaged by heat or the internal elements in the non-insulating DC—DC converter may be damaged, both of which are problems.

In addition, if an electronic equipment is connected to the non-insulating DC—DC converter, the internal elements in the electronic equipment may be damaged.

Furthermore, if the input cable 1c is connected to the negative-terminal side of the battery 1 as shown by the dotted line in the drawing, a reverse current from the low-voltage battery 7 may damage the MOSFET 2 and the check diode 12.

Furthermore, if the low-voltage battery 7 side is reversely connected, a reverse current from the low-voltage battery 7 causes a short-circuit current to flow via the diode 3, which may be damaged.

In addition, if the high-voltage battery 1 side is reversely connected, a short-circuit current may flow via the diode 3 to damage the MOSFET 2 and the check diode 12.

The present invention is provided in view of the above problems, and is intended to provide a non-insulating DC—DC converter that can prevent the internal elements from being damaged due to overvoltage or overcurrent, thus providing an appropriate power supply while also restraining costs.

SUMMARY OF THE INVENTION

To attain the above object, the present invention provides a non-insulating DC—DC converter for charging a low-voltage battery with a power from a high-voltage battery, which comprises a first semiconductor switching element for reducing a DC voltage from the high-voltage battery, a control circuit for controlling pulses relative to the first semiconductor switching element, a second semiconductor switching element provided on the output side of the first semiconductor switching element, a capacitor connected between the first and second semiconductor switching elements in parallel, and a first control circuit for detecting a voltage at one end of the capacitor and a voltage on the output side of the second semiconductor switching element and for turning off the second semiconductor switching element if an overvoltage occurs at the one end of the capacitor.

The converter may have a third semiconductor switching element provided on an input side of the second semiconductor switching element, controlled by the first control circuit and connected to the second semiconductor switching element in the reverse direction. If a current on the output side flows in the reverse direction, the first control circuit turns off the second or third semiconductor switching element having the same polarity as the reverse current.

The converter may have a third semiconductor switching element provided on an input side of the first semiconductor switching element, controlled by the second control circuit and connected to the first semiconductor switching element in the reverse direction relative thereto. If a current on the input side flows in the reverse direction, the second control circuit turns off the third semiconductor switching element.

The first control circuit may comprise a first drive power supply connected between the input side of the first semiconductor switching element and the second semiconductor switching element for driving the second semiconductor switching element, a second drive power supply connected between the input side of the first semiconductor switching element and the third semiconductor switching element for driving the third semiconductor switching element, a first detection circuit connected parallel to the output side of the second semiconductor switching element for detecting the connection status of the low-voltage battery and for driving the first and second drive power supplies if this connection is normal, and a second detection circuit connected parallel to the capacitor for detecting an overvoltage at one end of the capacitor and for stopping driving by the first drive power supply when any overvoltage is detected.

The third semiconductor switching element may be connected in series to the capacitor and turned on/off by a switch circuit. The first control circuit may comprise a first drive power supply connected between the input side of the first semiconductor switching element and the second semiconductor switching element for driving the second semiconductor switching element, and a third detection circuit connected parallel to the input side of the first semiconductor switching element. Upon detecting an input overvoltage, the third detection circuit may turn of f the third semiconductor switching element via the switch circuit, stop driving of the first drive power supply, and further turn off the first semiconductor switching element via the control circuit.

A first potential divider may be connected between the input and output of the first semiconductor switching element and in parallel. A second potential divider may be connected parallel to a diode connected parallel to the output side of the first semiconductor switching element. A maximum permissible voltage on the input side of the first semiconductor switching element may be determined by the first semiconductor switching element and diode and by the first and second potential dividers.

The first drive power supply may instantaneously be driven by a fourth detection circuit when a voltage sufficient to drive the second semiconductor switching element is detected. The second drive power supply may instantaneously be driven by a fifth detection circuit when a voltage sufficient to drive the third semiconductor switching element is detected.

The first to third semiconductor switching elements may be MOSFETs.

The non-insulating DC—DC converter constructed as described above prevents internal elements from being damaged due to an overvoltage or a reverse current. Namely, if an overvoltage occurs, the first control circuit turns off the second semiconductor switching element provided on the output side of the first semiconductor switching element. If the current on the output side flows in the reverse direction, the first control circuit turns off the second or third semiconductor switching element having the same polarity as the reverse current. If the current on the input side flows in the reverse direction, the second control circuit turns off the third semiconductor switching element.

DETAILED DESCRIPTION OF PREFERRED EMBODIMENTS

Figure 7:
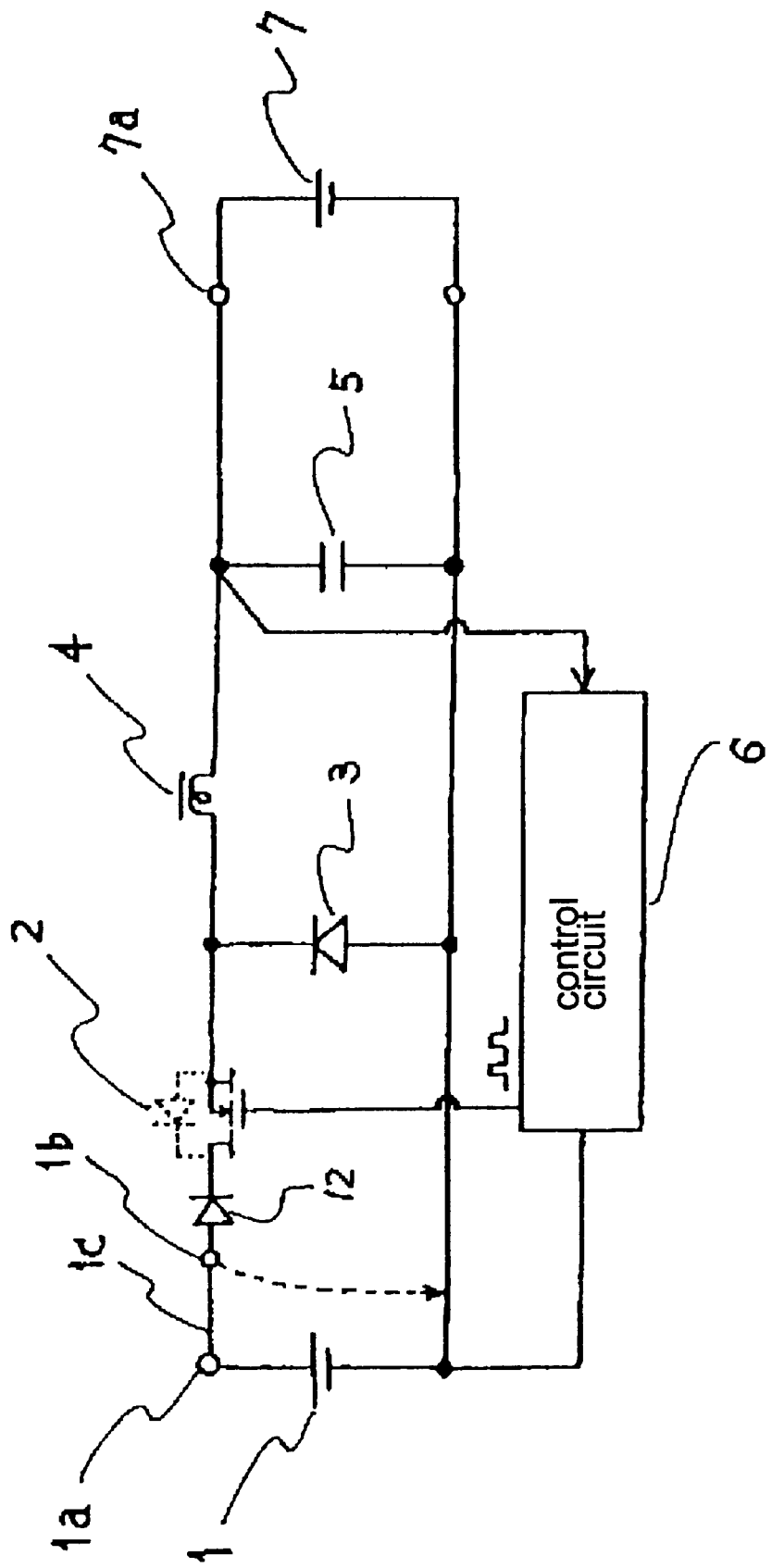
FIG. 7 is a circuit diagram showing a conventional noninsulating DC—DC converter.

Embodiments of the present invention will be described below. In the drawings described below, the same components as in FIG. 7 have the same reference numerals.

First embodiment

Figure 1:
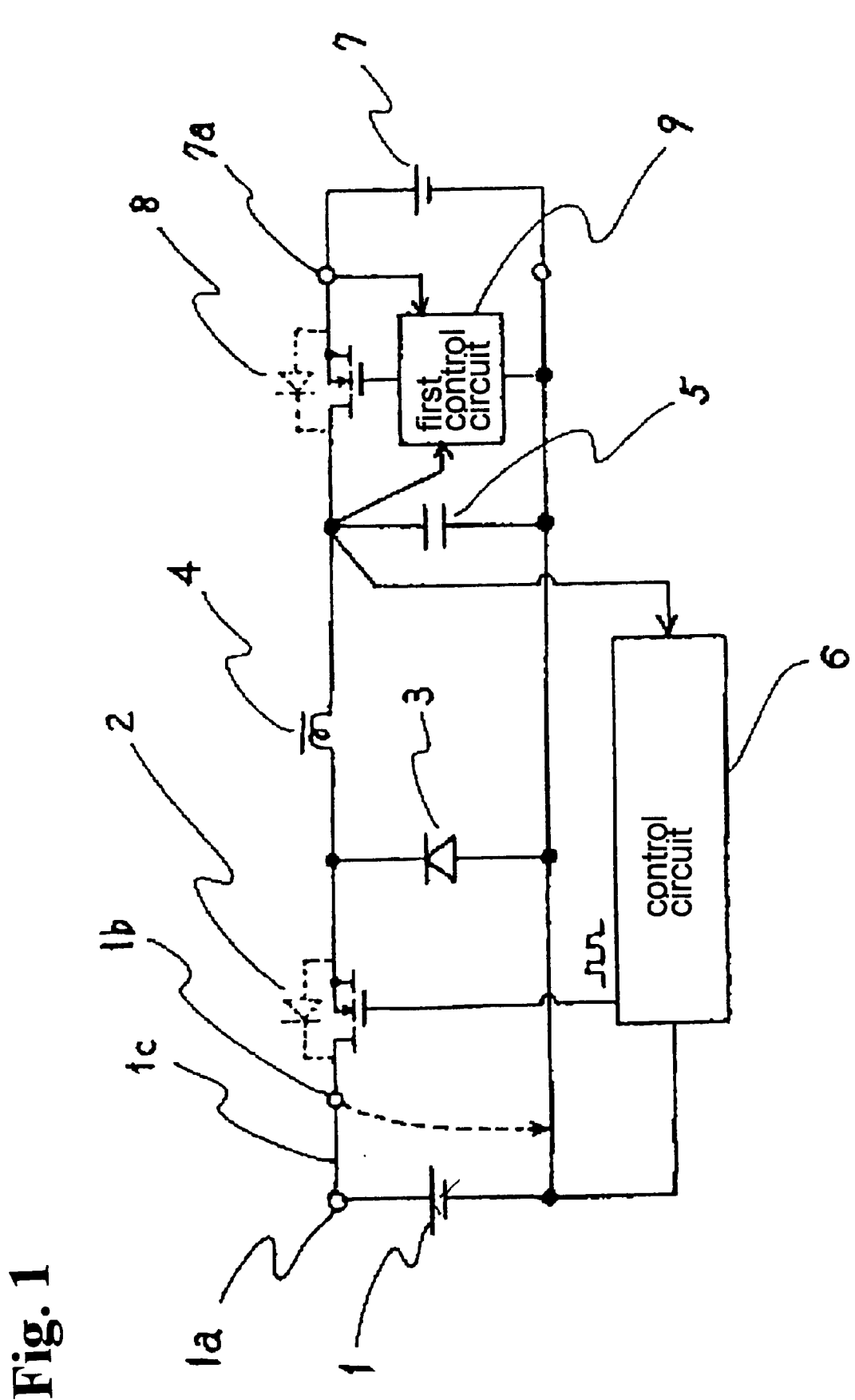
FIG. 1 is a circuit diagram showing a first embodiment of a non-insulating DC—DC circuit according to the present invention.

FIG. 1 is a circuit diagram showing a first embodiment of a non-insulating DC—DC converter according to the present invention.

The non-insulating DC—DC converter shown in FIG. 1 comprises an input terminal 1b and an output terminal 7a. A first MOSFET 2, a choke coil 4 and a second MOSFET 8 are connected in series between the input terminal 1b and the output terminal 7a.

In addition, a diode 3, a capacitor 5 and a first control circuit 9 are connected in parallel between the input terminal 1b and the output terminal 7a. An end of the capacitor 5 and an end of the output terminal 7a are connected to the first control circuit 9. The first control circuit 9 controls the second MOSFET 8.

The input terminal 1b has a battery terminal 1a for a high-voltage battery 1 connected via an input cable 1c.

An end of the high-voltage battery 1, a gate of the first MOSFET 2 and one end of the capacitor 5 are connected to a control circuit 6. The output terminal 7a is connected to a low-voltage battery 7.

Next, operation of the non-insulating DC—DC converter constructed as described above will be explained.

First, if a voltage applied to the input terminal 1b is normal, the control circuit 6 applies a pulse voltage to the gate of the first MOSFET 2 to control the on/off operation of the first MOSFET 2 in such a manner that a power from the high-voltage battery 1 is charged to the low-voltage battery 7. At this point, the second MOSFET 8 is turned on by the first control circuit 9.

If the first MOSFET 2 is damaged due to an overvoltage or another reason to cause an overvoltage at one end of the capacitor 5, the first control circuit 9 turns off the second MOSFET 8. This prevents an overcurrent from flowing in from the high-voltage battery 1 via the input cable 1c.

In addition, if the low-voltage battery 7 side is reversely connected, or the input cable 1c is connected to the negative-terminal side of battery 1 as shown by the dotted line in the drawing, or the input cable 1c is disconnected, then the first control circuit 9 turns off the second MOSFET 8.

This operation hinders a short-circuit current flowing via the diode 3 due to a reverse current from the low-voltage battery 7.

Thus, according to the first embodiment, if the first MOSFET 2 is damaged due to an overvoltage or another reason to cause an overvoltage at one end of the capacitor 5, the first control circuit 9 turns off the second MOSFET 8. This configuration can preclude an overcurrent from flowing in from the high-voltage battery 1 via the input cable 1c, thereby preventing the damage of the input cable 1c from heat or to the internal elements of the non-insulating DC—DC converter.

In addition, if an electronic equipment is connected to the non-insulating DC—DC converter, the internal elements of the electronic equipment are prevented from being damaged.

Furthermore, if the low-voltage battery 7 side is reversely connected, or the input cable 1c is connected to the negative-terminal side of the battery 1 as shown by the dotted line in the drawing, or the input cable 1c is disconnected, the first control circuit 9 turns off the second MOSFET 8. This configuration can hinder a short-circuit current flowing via the diode 3 due to a reverse current from the low-voltage battery 7, thereby preventing the diode 3 or the like from being damaged.

Second embodiment

Figure 2:
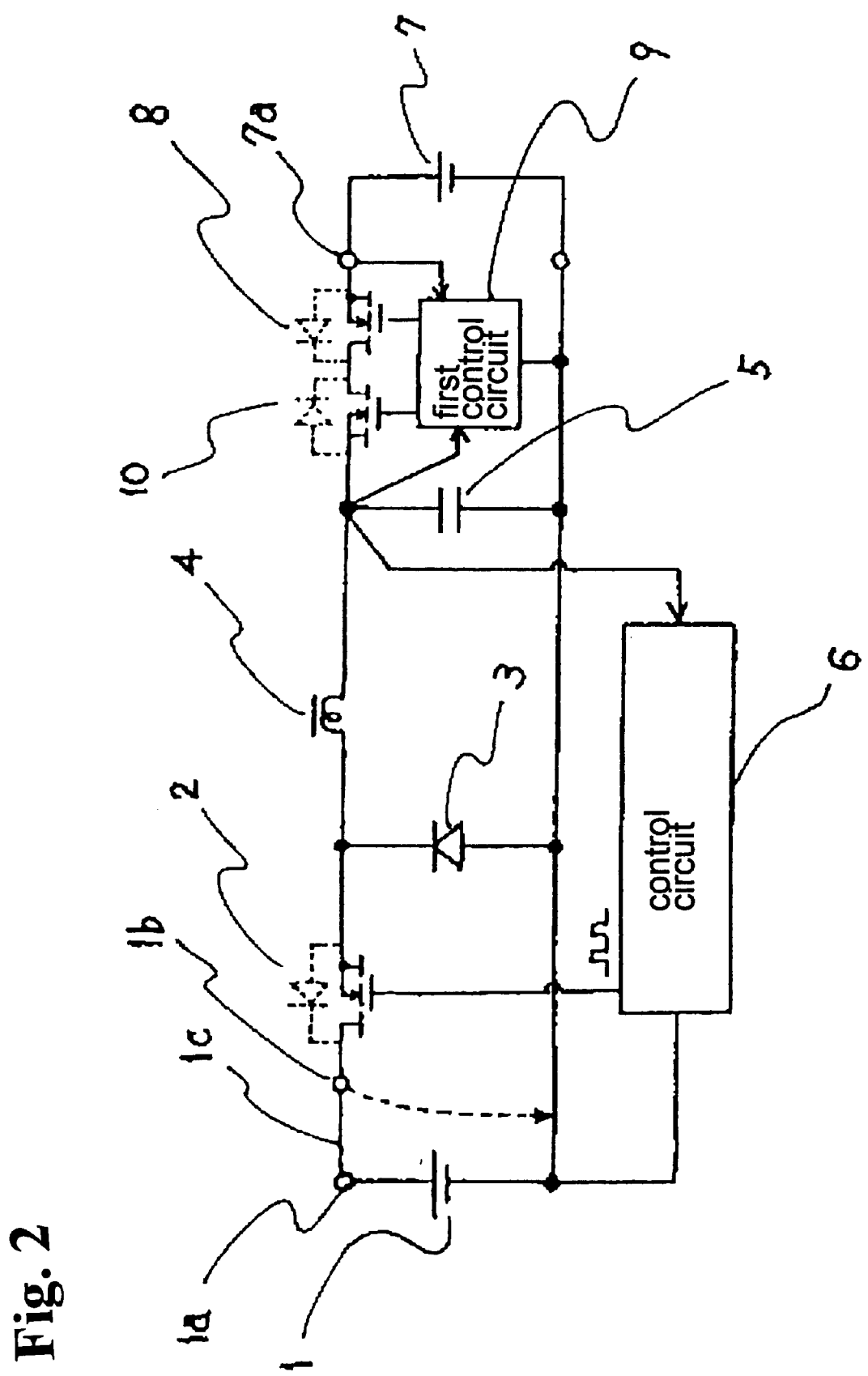
FIG. 2 is a circuit diagram showing a second embodiment of a non-insulating DC—DC converter according to the present invention.

FIG. 2 is a circuit diagram showing a second embodiment of a non-insulating DC—DC converter according to the present invention.

According to the second embodiment, a third MOSFET 10 is located before the second MOSFET 8 and connected in series thereto. The third MOSFET 10 is connected to the second MOSFET 8 in the reverse direction relative thereto.

The second and third MOSFETs 8 and 10 are controlled by the first control circuit 9. The first control circuit 9 detects a voltage at one end of the capacitor 5 and the voltage of the low-voltage battery 7.

In such a configuration, if a voltage applied to the input terminal 1b is normal, the control circuit 6 applies a pulse voltage to the gate of the first MOSFET 2 to control the on/off operation of the first MOSFET 2 in such a manner that the power from the high-voltage battery 1 is charged to the low-voltage battery 7. At this point, the second and third MOSFETs 8 and 10 are turned on by the first control circuit 9.

If the first MOSFET 2 is damaged due to an overvoltage or another reason to cause an overvoltage at one end of the capacitor 5, the first control circuit 9 turns off the second and third MOSFETs 8 and 10. This prevents an overcurrent from flowing in from the high-voltage battery 1 via the input cable 1c.

In addition, if the low-voltage battery 7 side is reversely connected, or the input cable 1c is connected to the negative-terminal side of the battery 1 as shown by the dotted line in the drawing, or the input cable 1c is disconnected, the voltage at one end of the capacitor 5 decreases below the voltage of the low-voltage battery 7. Then, the first control circuit 9 turns off the third MOSFET 10.

This operation hinders a short-circuit current flowing via the diode 3 due to a reverse current from the low-voltage battery 7.

Third embodiment

Figure 3:
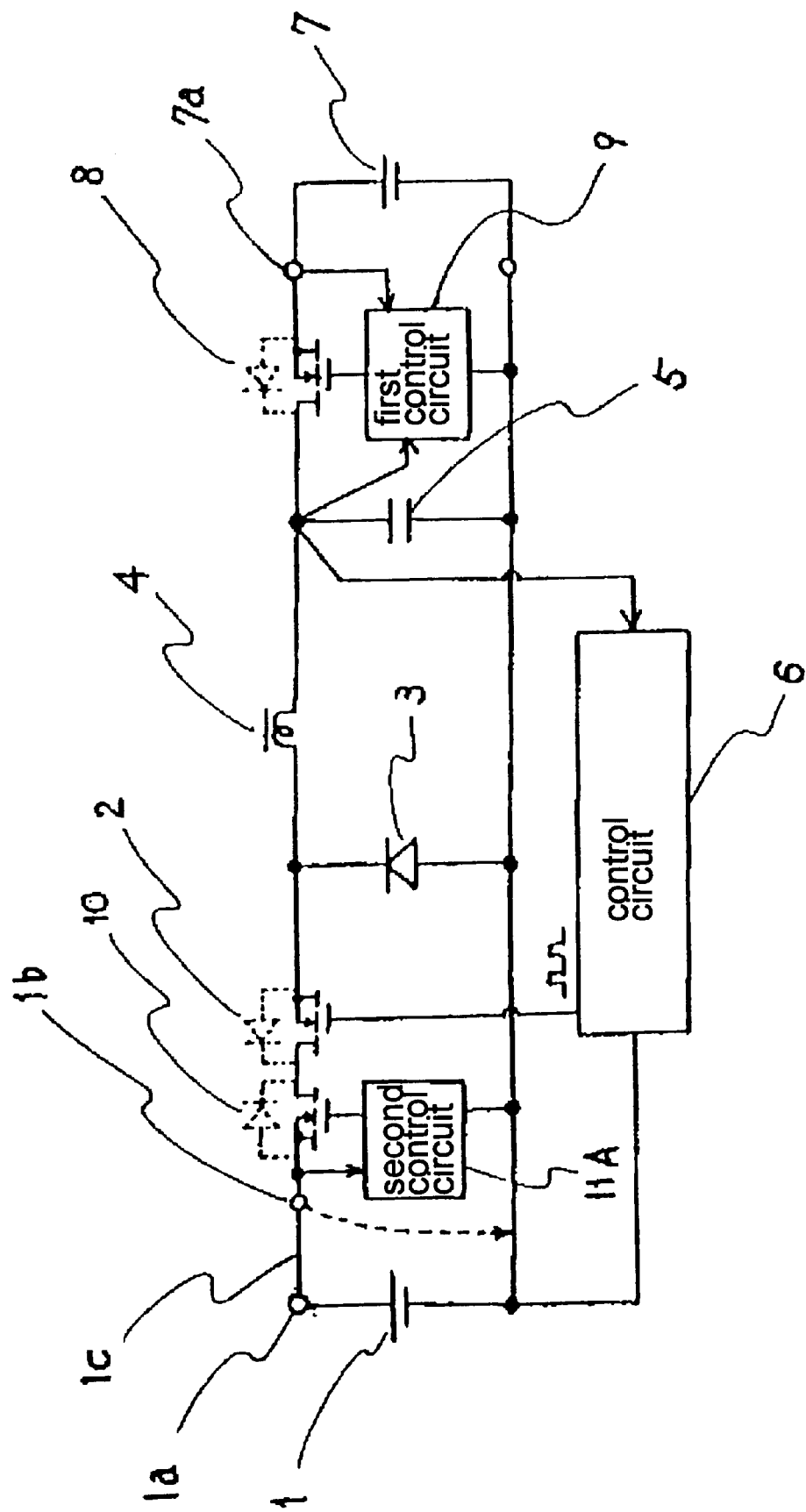
FIG. 3 is a circuit diagram showing a third embodiment of a non-insulating DC—DC converter according to the present invention.

FIG. 3 is a circuit diagram showing a third embodiment of a non-insulating DC—DC converter according to the present invention.

According to the third embodiment, the third MOSFET 10 is located before the first MOSFET 2 and connected in series thereto. The third MOSFET 10 is connected to the first MOSFET 2 in the reverse direction relative thereto.

The third MOSFET 10 is controlled by a second control circuit 11A. The second control circuit 11A detects a source voltage of the third MOSFET 10.

In such a configuration, if a voltage applied to the input terminal 1b is normal, the control circuit 6 applies a pulse voltage to the gate of the first MOSFET 2 to control the on/off operation of the first MOSFET 2 in such a manner that a power from the high-voltage battery 1 is charged to the low-voltage battery 7. At this point, the second and third MOSFETs 8 and 10 are turned on by the first and second control circuits 9 and 11A, respectively.

If the high-voltage battery 1 side is reversely connected, the second control circuit 11A turns of f the third MOSFET 10. This operation hinders a short-circuit current flowing via the diode 3.

In addition, if the first MOSFET 2 is damaged due to an overvoltage or another reason to cause an overvoltage at one end of the capacitor 5, the first control circuit 9 turns off the second MOSFET 8. This prevents an overcurrent from flowing in from the high-voltage battery 1 via the input cable 1c.

Furthermore, if the low-voltage battery 7 side is reversely connected, or the input cable 1c is connected to the negative-terminal side of the battery 1 as shown by the dotted line in the drawing, or the input cable 1c is disconnected, then the first control circuit 9 turns off the second MOSFET 8.

Although each of the above embodiments has been described in conjunction with the first to third MOSFETs 2, 8, 10 comprising an N channel, the present invention is not limited to this aspect. MOSFETs comprising a P channel may be used.

Fourth embodiment

Figure 4:
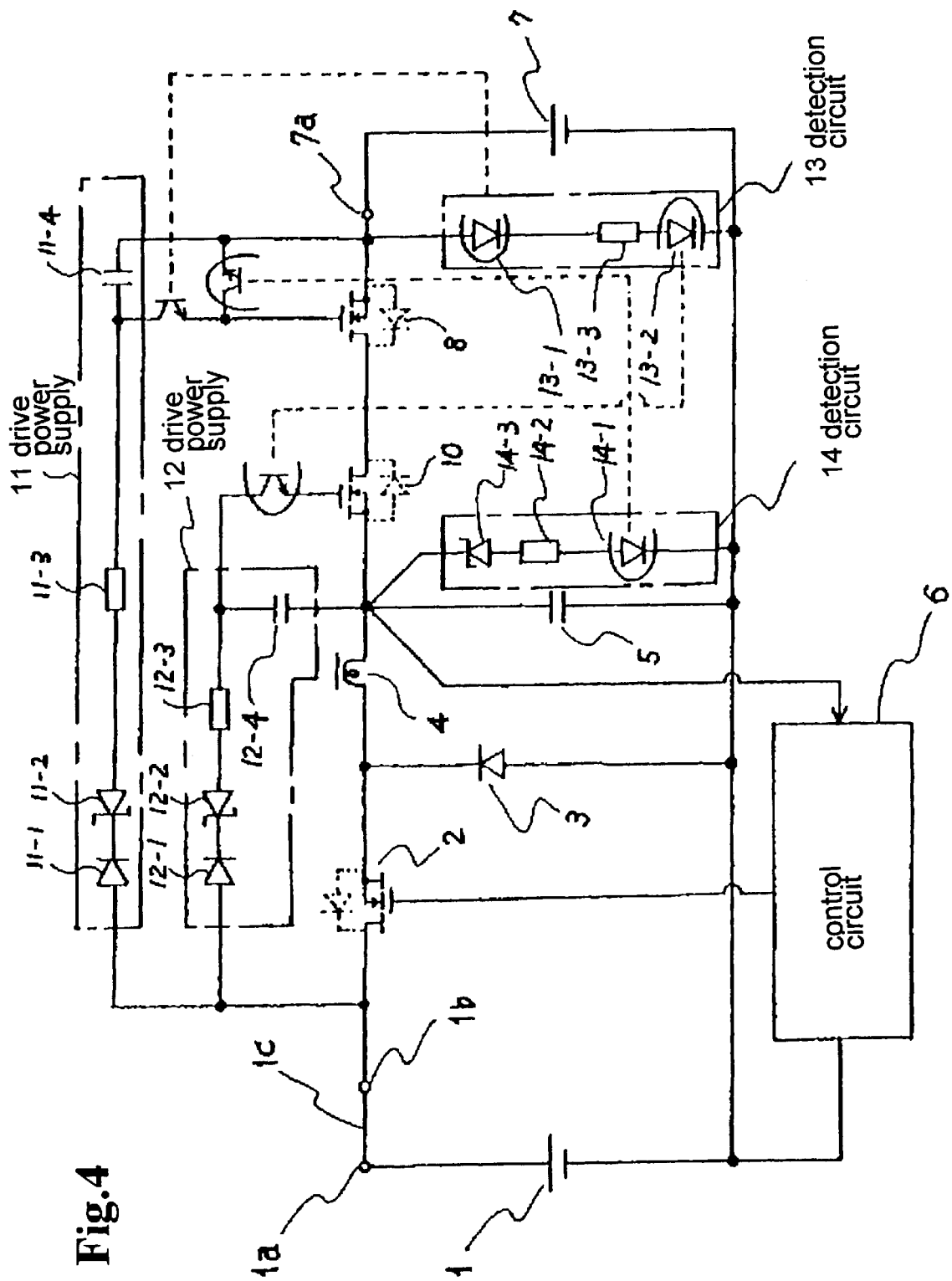
FIG. 4 is a circuit diagram showing a fourth embodiment, wherein the configuration of the non-insulating DC—DC converter in FIG. 2 has been changed.

FIG. 4 is a circuit diagram showing a fourth embodiment, wherein the configuration of the non-insulating DC—DC converter in FIG. 2 has been changed.

According to the fourth embodiment, the non-insulating DC—DC converter in FIG. 2 additionally includes a drive power supply 11 as a first drive power supply, a drive power supply 12 as a second drive power supply, a detection circuit 13 as a first detection circuit, and a detection circuit 14 as a second detection circuit. The first control circuit 9 in FIG. 2, however, is omitted.

The drive power supply 11 is a drive source for the second MOSFET 8 and is provided between the input side of the first MOSFET 2 and the gate of the second MOSFET 8. In addition, the drive power supply 11 is comprised of a diode 11-1, a Zener diode 11-2, a resistor 11-3, and a capacitor 11-4.

The drive power supply 12 is a drive source for the third MOSFET 10 and is provided between the input side of the first MOSFET 2 and the gate of the third MOSFET 10. In addition, the drive power supply 12 is comprised of a diode 12-1, a Zener diode 12-2, a resistor 12-3, and a capacitor 12-4.

The detection circuit 13 detects an output to the low-voltage battery 7 and is connected parallel to the output side of the second MOSFET 8. In addition, the detection circuit 13 is comprised of photocouplers 13-1, 13-2 and a resistor 13-3.

The detection circuit 14 detects an output overvoltage and is connected parallel to the capacitor 5. In addition, the detection circuit 14 is comprised of a photocoupler 14-1, a resistor 14-2, and a Zener diode 14-3.

In such a configuration, the second MOSFET 8 is turned on by a voltage charged in the capacitor 11-4 of the drive power supply 11 only when the high- and low-voltage batteries 1 and 7 are correctly connected to the input and output terminals 1b and 7a, respectively.

At this point, the third MOSFET 10 is turned on by a voltage charged in the capacitor 12-4 of the drive power supply 12.

On the other hand, if, for example, the low-voltage battery 7 is reversely connected to the output terminal 7a or an overvoltage is charged in the capacitor 5, the detection circuit 14 short-circuits the capacitor 11-4 to turn off the second MOSFET 8.

At this point, the detection circuit 13 short-circuits the capacitor 12-4 to also turn off the third MOSFET 10.

In addition, if, for example, the high- and low-voltage batteries 1 and 7 are reversely connected to the input and output terminals 1b and 7a, respectively, then the Zener diode 11-2 of the drive power supply 11 hinders the capacitor 11-4 from being charged. At this point, the Zener diode 12-2 of the drive power supply 12 also prevents the capacitor 12-4 from being charged.

In this manner, according to the fourth embodiment, the drive voltages for the second and third MOSFETs 8 and 10 are obtained from the voltages charged in the capacitors 11-4 and 12-4 of the drive power supplies 11 and 12, so that the power consumption is substantially reduced as compared to the conventional drive circuit consisting of a transformer.

This embodiment also eliminates the needs for transistors and ICs required by the prior art to operate oscillators or drive circuits, which are conventionally required for the control circuit, thereby enabling the number of required parts to be reduced, along with the reduction of device size and cost.

Fifth embodiment

Figure 5:
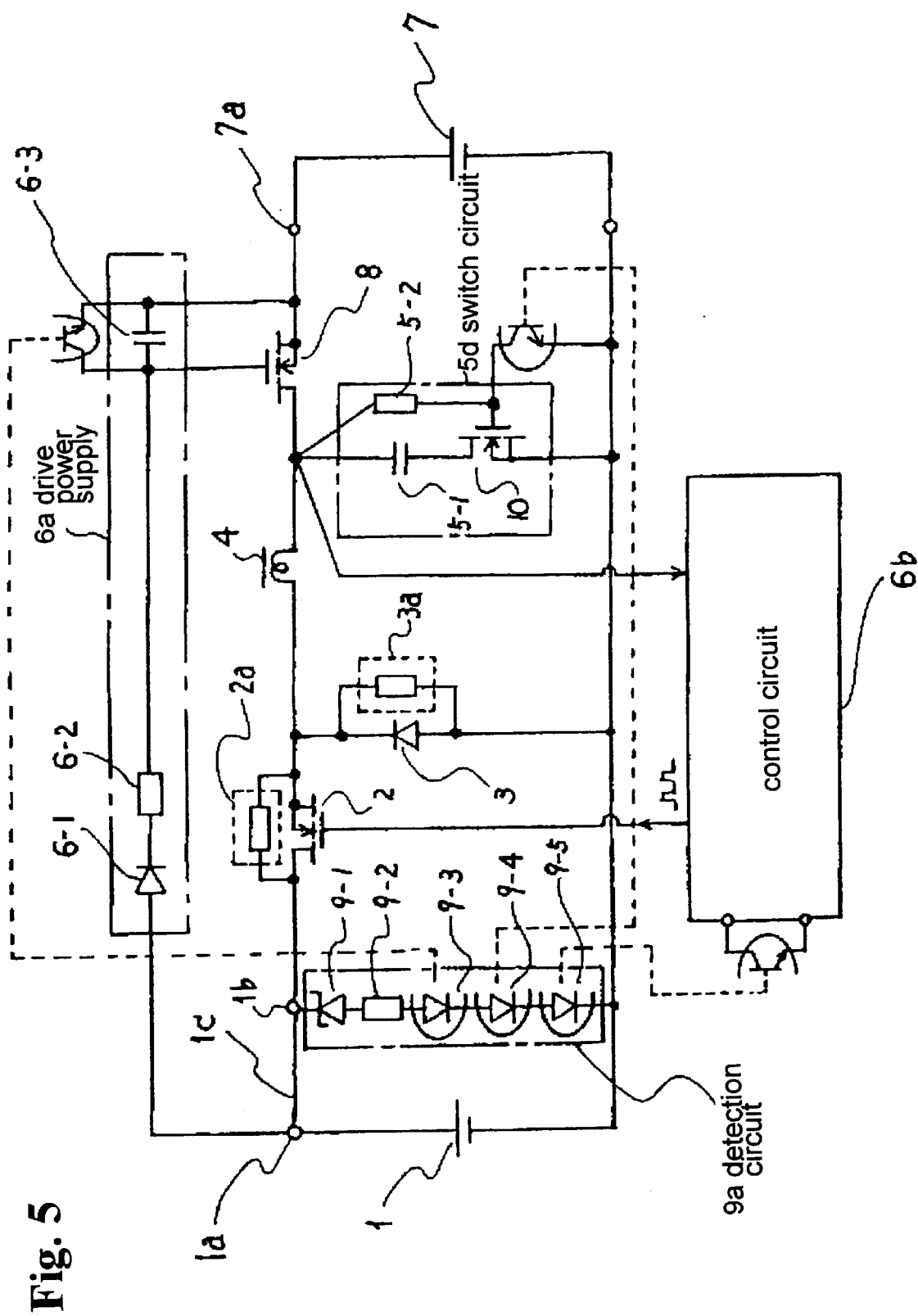
FIG. 5 is a circuit diagram showing a fifth embodiment, wherein the configuration of the non-insulating DC—DC converter in FIG. 2 has been changed.

FIG. 5 is a circuit diagram showing a fifth embodiment, wherein the configuration of the non-insulating DC—DC converter in FIG. 2 has been changed.

According to the fifth embodiment, the non-insulating DC—DC converter has a detection circuit 9a connected parallel to its input side as a third detection circuit for detecting an input voltage. The detection circuit 9a is comprised of a Zener diode 9-1, a resistor 9-2 and photocouplers 9-3 to 9-5. A detection output from the photocoupler 9-5 is provided to the control circuit 6b.

The non-insulating DC—DC converter also has a drive power supply 6a connected parallel between its input and output stages for driving the second MOSFET 8. The drive power supply 6a is comprised of a diode 6-1, a resistor 6-2 and a capacitor 6-3.

If an overvoltage occurs, the capacitor 6-3 is short-circuited by the photocoupler 9-3 of the detection circuit 9a to prevent the (4 charge.

The first MOSFET 2 has a potential divider 2a provided between its source and drain as a first potential divider. The diode 3 has a potential divider 3a provided at its opposite ends as a second potential divider.

A switch circuit 5a is provided between the choke coil 4 and the second MOSFET 8. The switch circuit 5a is comprised of a capacitor 5-1, a resistor 5-2 and the third MOSFET 10.

If an overvoltage occurs, the capacitor 5-1 is short-circuited by the photocoupler 9-4 of the detection circuit 9a to prevent the charge.

In such a configuration, when the detection circuit 9a detects an input overvoltage, the photocoupler 9-3 short-circuits the capacitor 6-3 to turn off the second MOSFET 8.

In addition, the photocoupler 9-4 short-circuits the capacitor 5-1 to turn of f the third MOSFET 10. Furthermore, based on a detection output from the photocoupler 9-5, the control circuit 6b turns off the first MOSFET 2.

At this point, the current through the choke coil 4 normally becomes zero at the time (Δt=(L/V0) I0, due to output voltages from the low-voltage battery 7 and capacitor 5-1. In this case, L designates the value of the choke coil 4, VO is an output voltage, and I0 is an output current.

According to the fifth embodiment, however, an output voltage from the capacitor 5-1 or the second MOSFET 8 is an avalanche voltage higher than V0, thereby further reducing the time Δt.

When the current through the choke coil 4 apparently becomes zero, only the first MOSFET 2 and the diode 3 are operative within the circuit as seen from the input terminal 1b side. Thus, the voltage is determined by the first MOSFET 2, the diode 3 and the potential dividers 2a, 3a. As a result, in the prior art, the maximum permissible voltage of an input corresponds to the voltage resistance of the element 2, whereas in the fifth embodiment, it corresponds to the voltage resistance of the element 2 plus the voltage resistance of the element 3.

In this manner, according to the fifth embodiment, when the detection circuit 9a detects an input overvoltage, the second MOSFET 8, the third MOSFET 10 and the first MOSFET 2 are simultaneously turned off, so that the maximum permissible voltage of an input corresponds to the voltage resistance of the element 2 plus the voltage resistance of the element 3, as compared to the voltage resistance of the element 2 in the prior art.

Specifically, if the first MOSFET 2 and the diode 3 are comprised of 100-V-resistant elements and the non-insulating DC—DC converter is stopped within 100 V, the maximum permissible voltage is 200 V.

This characteristic can avoid the need to use a higher-voltage-resistant element for the first MOSFET 2, thus preventing any decrease in efficiency while restraining costs.

Sixth embodiment

Figure 6:
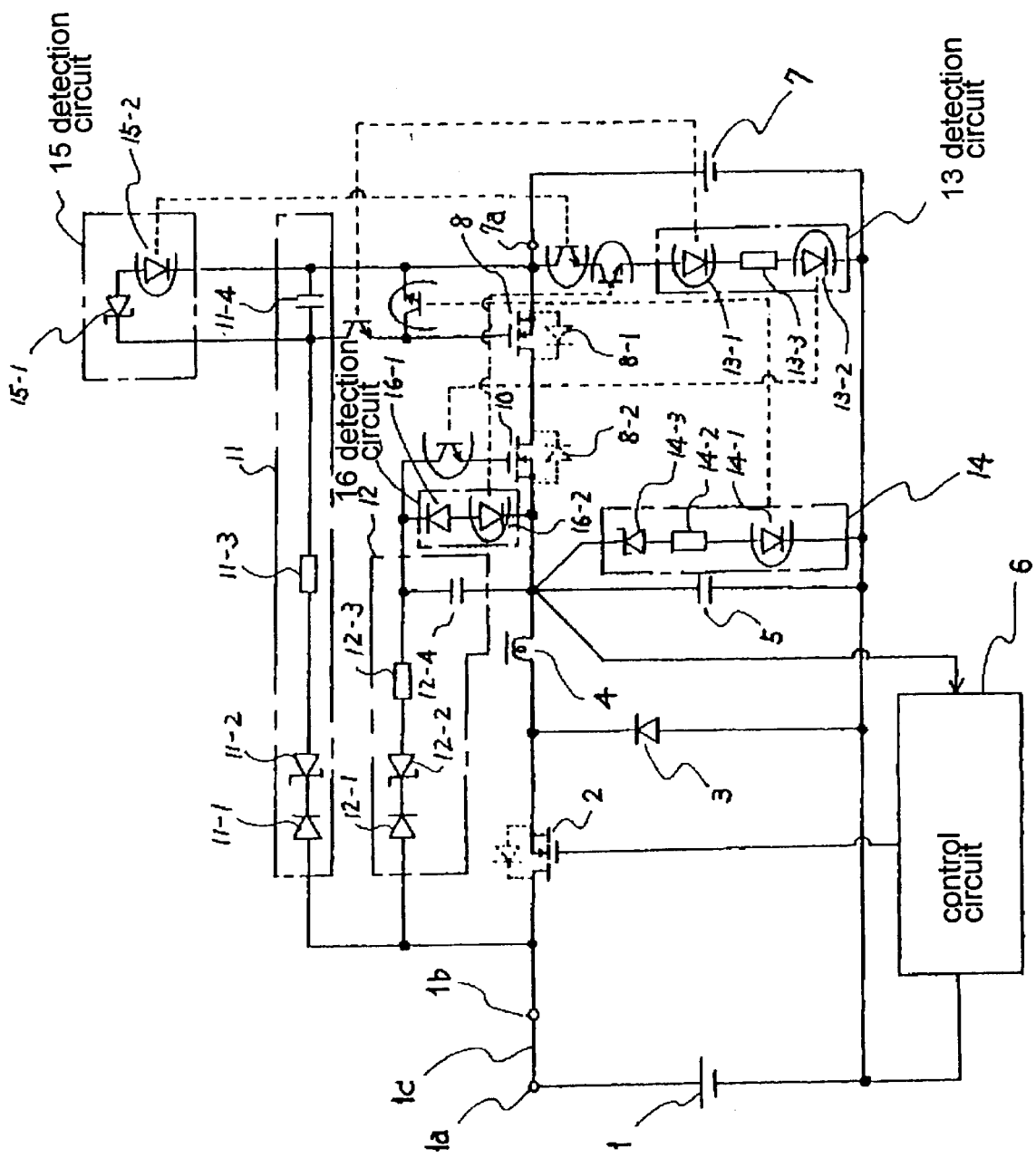
FIG. 6 is a circuit diagram showing a sixth embodiment, wherein the configuration of the non-insulating DC—DC converter in FIG. 4 has been changed.

FIG. 6 is a circuit diagram showing a sixth embodiment, wherein the configuration of the non-insulating DC—DC converter in FIG. 4 has been changed.

According to the sixth embodiment, the non-insulating DC—DC converter in FIG. 4 additionally has detection circuits 15 and 16 for detecting voltages.

The detection circuit 15 acting as a fourth detection circuit detects a voltage sufficient to drive the second MOSFET 8 and is comprised of a Zener diode 15-1 and a photocoupler 15-2. The detection circuit 16 acting as a fifth detection circuit detects a voltage sufficient to drive the third MOSFET 10 and is comprised of a Zener diode 16-1 and a photocoupler 16-2.

In such a configuration, when the Zener diode 15-1 of the detection circuit 15 reaches the voltage sufficient to drive the second MOSFET 8, the photocoupler 15-2 directly couples the Zener diode 15-1 to the detection circuit 13.

In addition, when the Zener diode 16-1 of the detection circuit 16 reaches the voltage sufficient to drive the third MOSFET 10, the photocoupler 16-2 directly couples the Zener diode 16-1 to the detection circuit 13. Then, the photocouplers 13-1 and 13-2 of the detection circuit 13 instantaneously turn on the second MOSFET 8 and the third MOSFET 10.

In this manner, according to the sixth embodiment, when the Zener diode 15-1 of the detection circuit 15 or the Zener diode 16-1 of the detection circuit 16 reaches a voltage sufficient to drive the second MOSFET 8 or the third MOSFET 10, the second and third MOSFETs 8 and 10 are instantaneously turned on, to thereby reduce the losses in the second and third MOSFETs 8 and 10 and to allow the use of inexpensive elements.

As described above, the present invention prevents internal elements from being damaged due to an overvoltage or a reverse current. Namely, if an overvoltage occurs, the first control circuit turns off the second semiconductor switching element provided on the output side of the first semiconductor switching element. If the current on the output side flows in the reverse direction, the first control circuit turns off the second or third semiconductor switching element having the same polarity as the reverse current. If the current on the input side flows in the reverse direction, the second control circuit turns off the third semiconductor switching element. Therefore, in the present invention, an appropriate power supply is maintained.

While the present invention has been explained with reference to the specific embodiments of the invention, the explanation is illustrative and the invention is limited only by the appended claims.

What is claimed is:

1. A non-insulating DC—DC converter for charging a power from a high-voltage battery to a low-voltage battery, comprising:

a first semiconductor switching element for reducing a DC voltage from said high-voltage battery;

a basic control circuit connected to the first semiconductor switch element for controlling pulses relative to the first semiconductor switching element;

a second semiconductor switching element provided on an output side of the first semiconductor element;

a capacitor connected between the first and second semiconductor switching elements in parallel; and a first control circuit connected to one end of the capacitor and an output side of the second semiconductor switching element, said first control circuit detecting a voltage at said one end of the capacitor and a voltage at the output side of the second semiconductor switching element and turning off the second semiconductor switching element if an overvoltage occurs at said one end of the capacitor.

2. A non-insulating DC—DC converter according to claim 1, further comprising a third semiconductor switching element connected to an input side of the second semiconductor switching element in a reverse direction relative thereto, said third semiconductor switching element being controlled by said first control circuit so that if a current on the output side of the second semiconductor switching element flows in a reverse direction, said first control circuit turns off one of the second and third semiconductor switching elements having a same polarity as the reverse current.

3. A non-insulating DC—DC converter according to claim 2, wherein said first control circuit comprises:

a first drive power supply connected between an input side of the first semiconductor switching element and the second semiconductor switching element for driving the second semiconductor switching element, a second drive power supply connected between the input side of the first semiconductor switching element and the third semiconductor switching element for driving the third semiconductor switching element, a first detection circuit connected parallel to the output side of the second semiconductor switching element for detecting a connection state of the low-voltage battery and for driving said first and second drive power supplies if the connection state with the low-voltage battery is normal; and a second detection circuit connected parallel to the capacitor for detecting an overcurrent at one end of the capacitor and for stopping driving of the first drive power supply when said overcurrent is detected.

4. A non-insulating DC—DC converter according to claim 3, further comprising a third detection circuit connected to the first driving power supply for instantaneously driving the same when a voltage sufficient to drive the second semiconductor switching element is detected, and a fourth detection circuit connected to the second drive power supply for instantaneously driving the same when a voltage sufficient to drive the third semiconductor switching element is detected.

5. A non-insulating DC—DC converter according to claim 2, wherein said third semiconductor switching element is connected in series to the capacitor and turned on/off by a switch circuit, and said first control circuit comprises:

a first drive power supply connected between an input side of the first semiconductor switching element and the second semiconductor switching element for driving the second semiconductor switching element, and a third detection circuit connected parallel to the input side of the first semiconductor switching element so that upon detection of an input overcurrent, said third detection circuit turns of f the third semiconductor switching element via the switch circuit thereof, stops driving of the first drive power supply, and further turns off the first semiconductor switching element via said basic control circuit.

6. A non-insulating DC—DC converter according to claim 5, further comprising a first potential divider connected parallel between the input and output of the first semiconductor switching element, a diode situated parallel to the output side of the first semiconductor switching element, and a second potential divider connected parallel to the diode, a maximum permissible voltage on the input side of the first semiconductor switching element being determined by the first semiconductor switching element and diode and by the first and second potential dividers.

7. A non-insulating DC—DC converter according to claim 1, further comprising a third semiconductor switching element connected to an input side of the first semiconductor switching element in a reverse direction relative thereto, and a second control circuit connected to the third semiconductor switching element so that if a current on the input side of the first semiconductor switching element flows in the reverse direction, the second control circuit turns off the third semiconductor switching element.

8. A non-insulating DC—DC converter according to claim 1, wherein said first and second semiconductor switching elements are MOSFETs.

* * * * *